Feb. 16, 1926.  
E. W. BERGERE  
SLIDE PROJECTOR  
Filed June 28, 1924  
1,573,030  
6 Sheets-Sheet 1

INVENTOR  
EMERICK W. BERGERE  
BY  
G. H. Braddock  
ATTORNEY.

Feb. 16, 1926.
E. W. BERGERE
1,573,030
SLIDE PROJECTOR
Filed June 28, 1924
6 Sheets-Sheet 2

INVENTOR
EMERICK W. BERGERE.
BY
G. H. Braddock
ATTORNEY

Feb. 16, 1926.

E. W. BERGERE 1,573,030

SLIDE PROJECTOR

Filed June 28, 1924    6 Sheets-Sheet 5

INVENTOR
EMERICK W. BERGERE
BY
G. H. Braddock
ATTORNEY

Feb. 16, 1926.

E. W. BERGERE 1,573,030

SLIDE PROJECTOR

Filed June 28, 1924

INVENTOR
EMERICK W. BERGERE.
BY
G. H. Braddock
ATTORNEY.

Patented Feb. 16, 1926.

1,573,030

UNITED STATES PATENT OFFICE.

EMERICK W. BERGERE, OF BRIDGEPORT, CONNECTICUT, ASSIGNOR TO FRANK HOWARD, OF NEW YORK, N. Y.

SLIDE PROJECTOR.

Application filed June 28, 1924. Serial No. 722,988.

*To all whom it may concern:*

Be it known that EMERICK W. BERGERE, a citizen of the United States, and resident of Bridgeport, in the county of Fairfield and State of Connecticut, has invented certain new and useful Improvements in Slide Projectors, of which the following is a specification.

This invention relates to a machine, known as a lantogram or slide projector, for projecting signs or pictures on a screen.

An object of the invention is to provide an automatic machine of the present character which will possess various simple and novel features and characteristics of construction adapted to render the machine reliable and durable in use to perform its intended function in efficient and improved manner.

A further object is to provide a lantogram having a plurality of slide holders, each adapted to carry a lantern slide ordinarily bearing an advertisement, and having a plurality, two or more, of stations each with screen upon which the advertisements of the lantern slides are to be projected, and to provide in the machine mechanism for automatically feeding the slides to and from each station, whereby the advertisement of each slide is successively fed from station to station in the machine.

A further object is to provide a lantogram or slide projector as stated, wherein there can be any preferred and variable number of lantern slides upon the machine, the feeding of the slides successively from station to station being independent of the number of slides and slide holders located between the respective stations.

A further object is to provide a novel and improved continuous track or runway for the slide holders, and to associate with said track or runway and said slide holders unique devices adapted to the purposes of successively feeding the slide holders and allowing the same to be fed to and from the stations in the machine.

A further object is to provide in the machine an improved arrangement for the projection of light from a lamp with reflector to a mirror utilized in connection with each advertisement projecting station, the arrangement including a casing housing the lamp and reflector, a condenser through which the light is made to pass, and a focusing lens adjustable toward and away from the condenser and lamp, whereby the light from the lamp and its reflector and passing through the advertisements of the different slides can be properly focused upon the mirrors for projection to the screens.

A further object is to provide a simple arrangement for associating each mirror with a focusing lens whereby the angle of the mirror can be adjusted with respect to a screen.

And yet another object is to provide slide holders of simple structure capable of readily and easily removably receiving the lantern slides, and of themselves being incorporated in or removed from a continuous chain of slide holders extending past all of the stations in the machine.

With the above objects in view, as well as others which will appear as the specification proceeds, the invention comprises the construction, arrangement and combination of parts as now to be fully described and as hereinafter to be specifically claimed, it being understood that the disclosure herein is merely illustrative and meant in no way in a limiting sense, changes in details of construction and arrangement of parts being permissible so long as within the spirit of the invention and the scope of the appended claims.

In the accompanying drawing forming a part of this specification,

Figure 1:
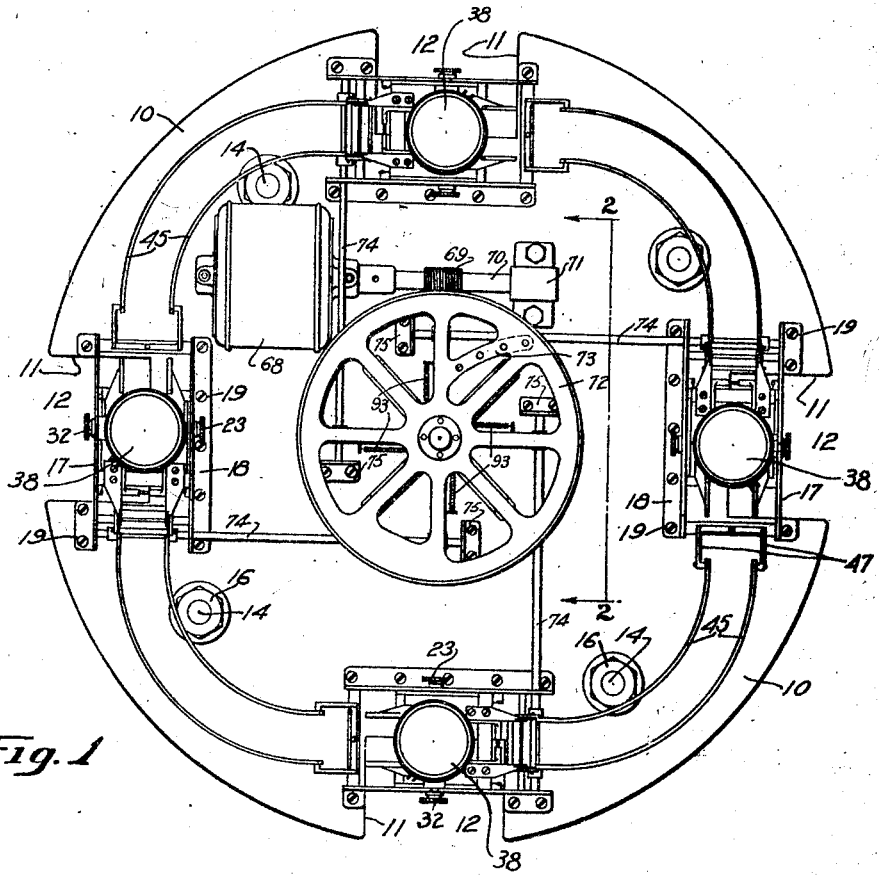
Fig. 1 is a bottom plan view of a machine in which the features of the invention are incorporated, the casing for the lamp, reflector and condenser being shown in section as on line 1—1 in Fig. 3, looking in the direction of the arrows.
Figure 2:
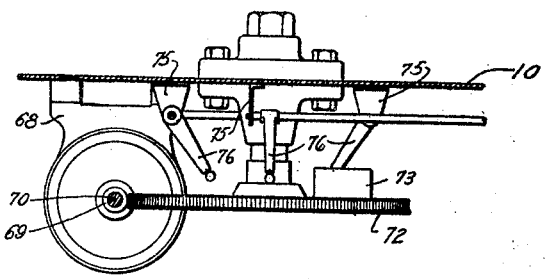
Fig. 2 is a sectional view on line 2—2 in Fig. 1, looking in the direction of the arrows.
Figure 3:
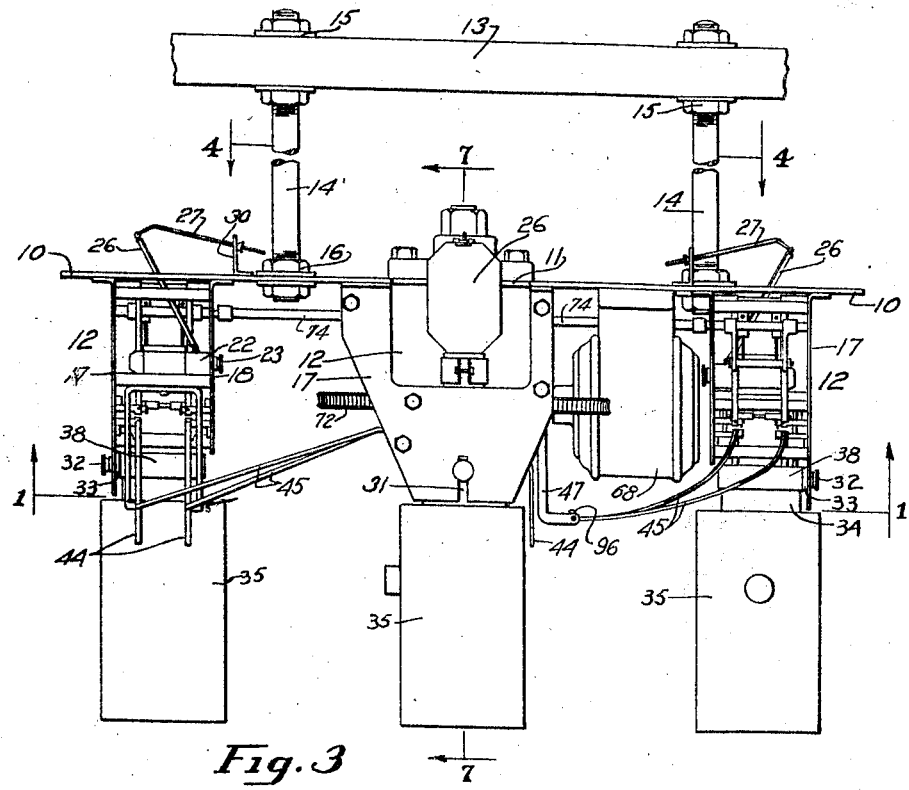
Fig. 3 is an elevational view of the machine.
Figure 4:
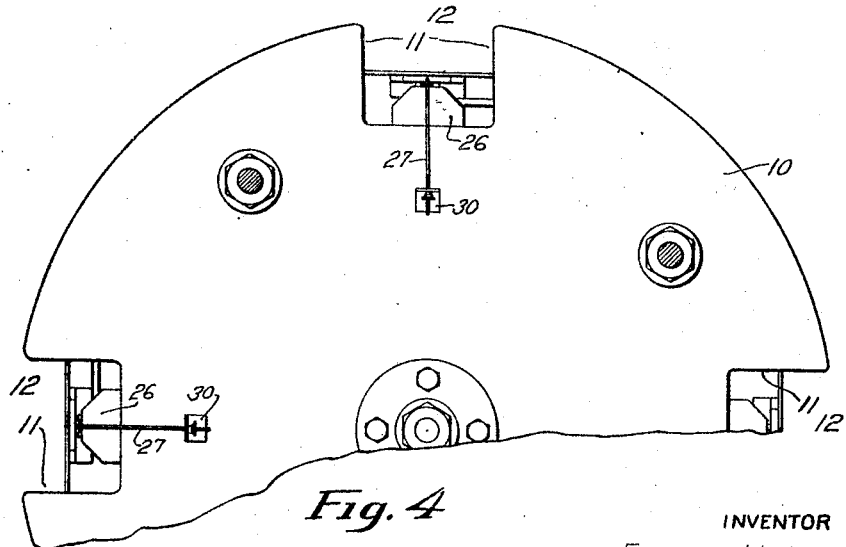
Figure 5:
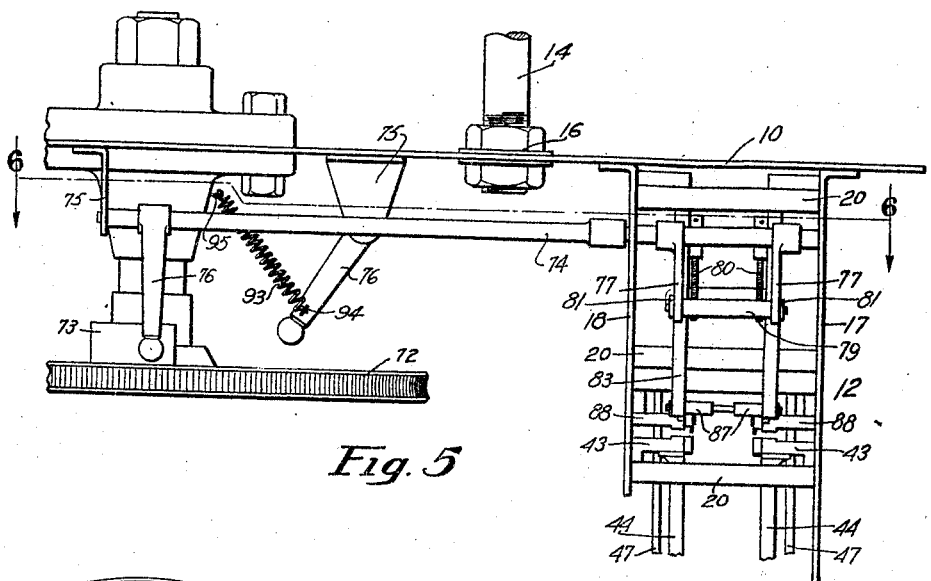
Figure 6:
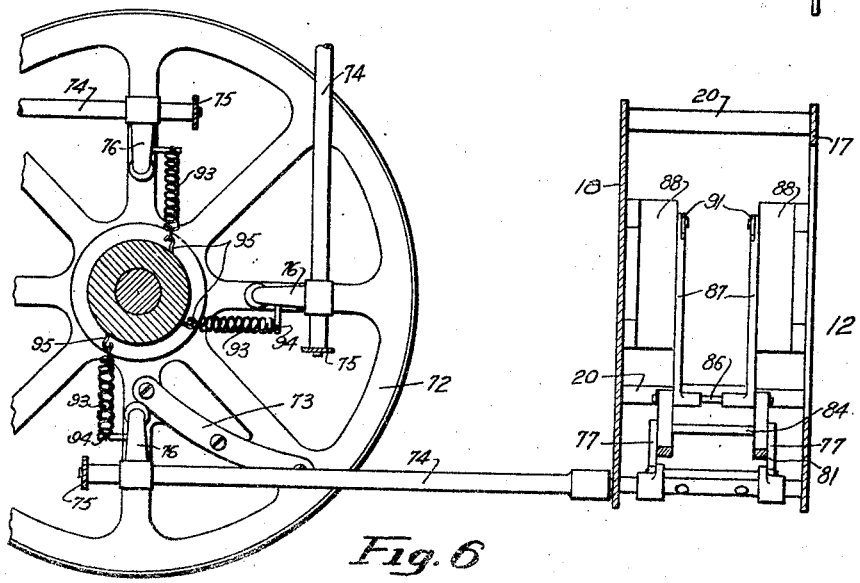
Figure 7:
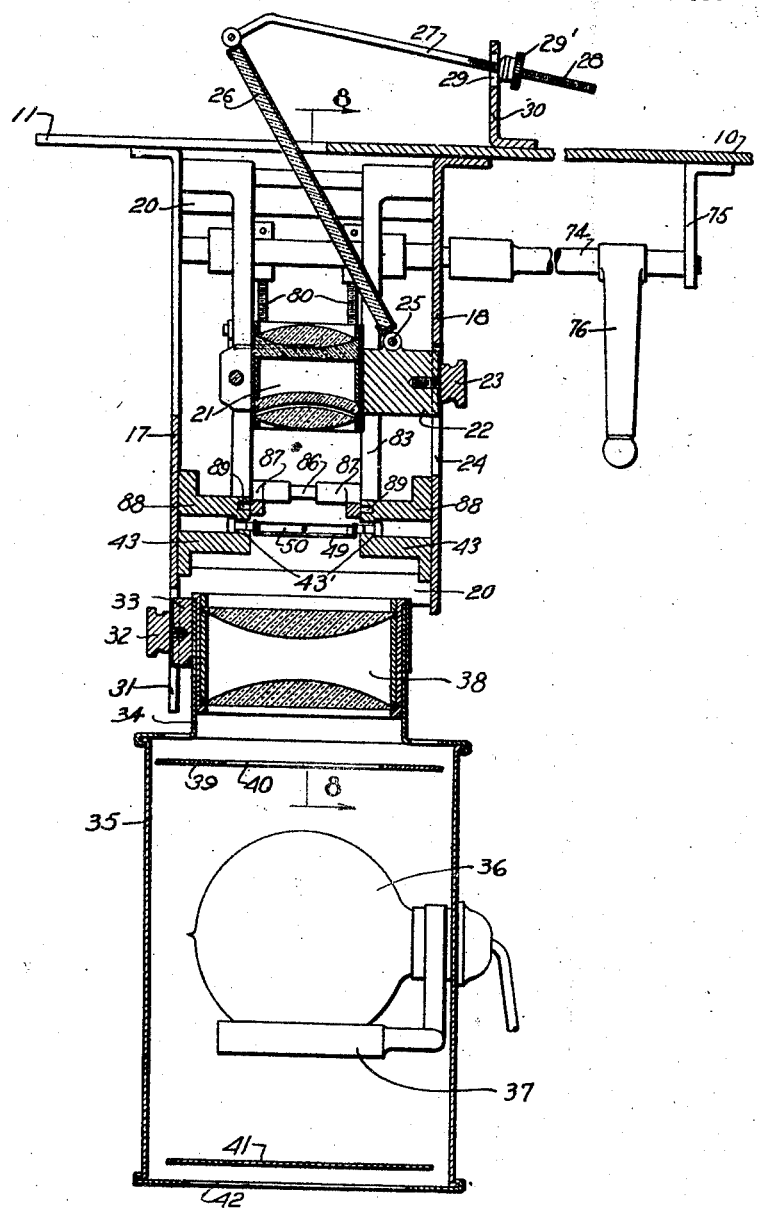
Figure 8:
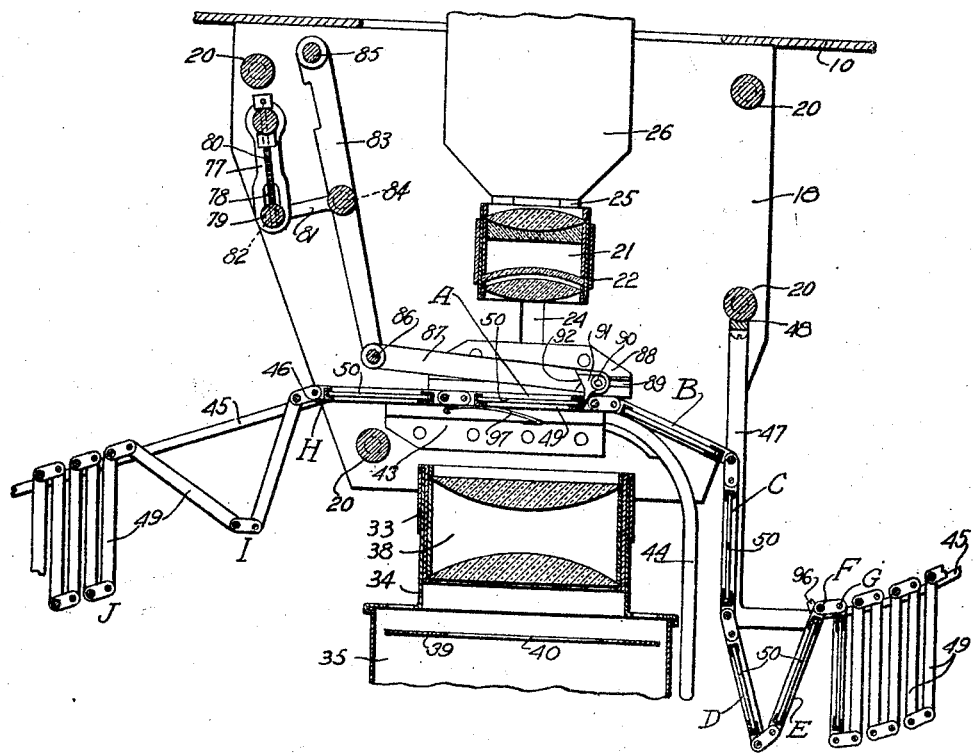
Figures 9, 10:
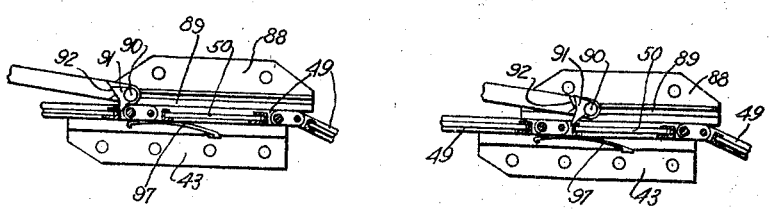
Figure 11:
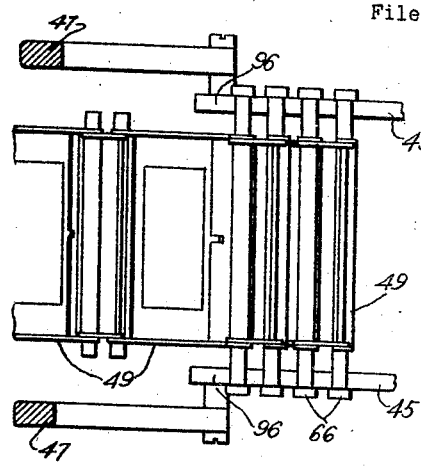
Figure 12:
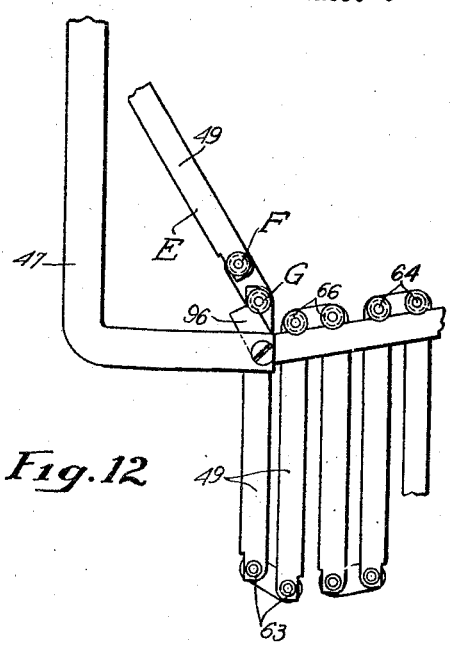
Figure 13:
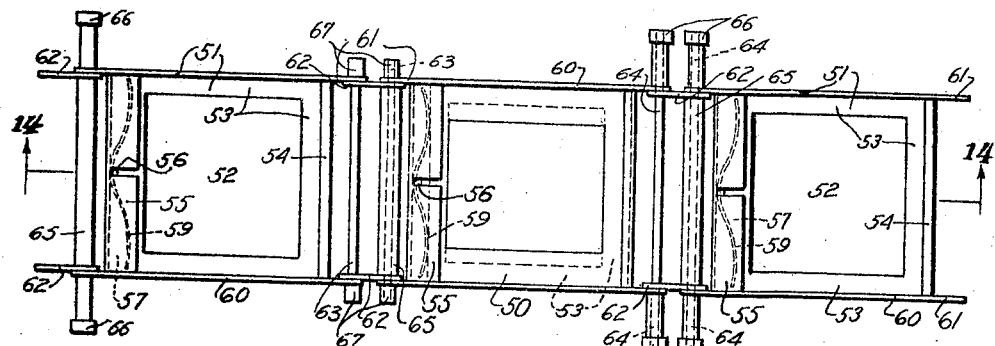

Fig. 4—4 is a sectional view, as on line 4—4 in Fig. 3, looking in the direction of the arrows, showing a fragment of the machine;

Fig. 5 is an enlarged elevational view detailing more clearly portions of the machine as disclosed in Fig. 3;

Fig. 6 is a sectional view as on line 6—6 in Fig. 5, looking in the direction of the arrows;

Fig. 7 is a sectional view on an enlarged scale on line 7—7 in Fig. 3, looking in the direction of the arrows;

Fig. 8 is a sectional view as on line 8—8 in Fig. 7, looking in the direction of the arrows;

Figs. 9 and 10 are detail views disclosing the manner in which the slide holders with slides are fed to and away from the advertisement projecting stations;

Fig. 11 is a plan view of Fig. 12;

Fig. 12 is a detail in elevation disclosing slide holders as when being fed to a station, corresponding with the showing of Fig. 8;

Fig. 13 is a plan view of connected slide holders with lantern slides; and

Figure 14:
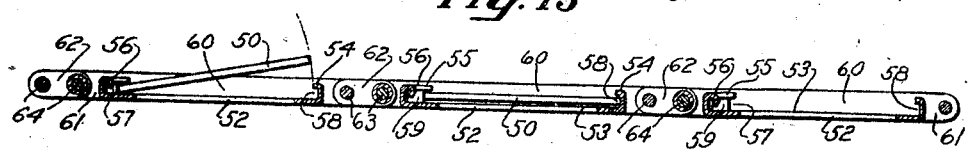

Fig. 14 is a sectional view on line 14—14 in Fig. 13, looking in the direction of the arrows, disclosing a lantern slide as when being inserted in or removed from a holder, a lantern slide in its normal position in a holder, and a slide holder with lantern slide removed.

In the present application I have preferred to illustrate an embodiment of the lantogram or slide projector including four duplicate stations each with mirror adapted to project an advertisement or sign, there being, naturally, four screens (not shown), one facing each mirror at preferred distance from the mirror, upon which the advertisements or signs are to be projected. Clearly, as will be understood from the description following, the machine could include a greater or less number of stations.

Of the lantogram, 10 is a frame plate, approximately circular as disclosed, having cut-away portions 11 at the four stations 12 in the machine. The frame plate may be supported in any manner. As illustrated, it is suspended from a beam 13 by means of bolts 14 attached to the beam at 15 and to the frame plate at 16.

The mechanism of each station 12 constitutes a unit of the machine, all of the units being duplicates and being supported by the frame plate.

Of each unit, 17, 18 are spaced apart uprights secured to the lower face of the frame plate by the screws 19, and 20 are tie rods connecting said uprights. Between the uprights 17, 18 is a focusing lens 21 desirably equidistant from each upright and attached in any suitable manner to a slide block 22 carried by a thumb piece 23 vertically adjustable in a slot 24 in the upright 18, the slide block having pivoted to it at 25 an ordinarily obliquely positioned mirror 26 the upper end of which is pivoted to a rod 27 with threaded end portion 28 passing through a vertical elongated slot 29 in a bracket 30 secured to the upper face of the frame plate, there being an adjusting nut 29' upon the threaded end portion 28 whereby the angle of inclination of the mirror can be adjusted. The elongated slot in the bracket 30 allows the rod vertical swinging movement to compensate for vertical adjustments of the slide block with focusing lens and carrying the mirror, as will be understood.

The lower end portion of the upright 17 has a vertical elongated slot 31 in which a thumb piece 32 is adjustable, said thumb piece 32 carrying a collar 33 which envelops and supports the neck portion 34 of a casing 35 enclosing a lamp 36 with reflector 37. Numeral 38 represents a condenser supported in any suitable manner in the neck portion 34, directly beneath the focusing lens, and designed to direct all light through it to the focusing lens.

The casing 35 has a plate 39 with opening 40 above the lamp and beneath the condenser, and a plate 41 beneath the reflector, and the base of the casing has a ventilating opening 42. The plates 39 and 41 are spaced from the side walls of the casing to assist ventilation through the opening 42, while said plates, together with the casing, direct light from the lamp through the condenser and to the focusing lens. The casing and condenser are supported from the upright 17 by the thumb piece 32, and by adjusting the thumb piece in the elongated slot 31 the lamp and condenser are adjusted toward or away from the focusing lens.

The lantern slides are adapted to be passed between the uprights 17, 18 and the focusing lens and condenser of each unit, and each lantern slide is adapted to remain stationary at a station to be projected to its mirror and thence to its screen for a desired and predetermined interval of time. To the accomplishment of this end, a continuous chain of slide holders and a continuous track or runway for the chain is provided, the sections of the track or runway being duplicates. That is, in the machine illustrated, there are four duplicate sections of track or runway.

Of each section of the track or runway, 43 are spaced apart and opposed guides carried by the inner faces of the uprights 17, 18 and having rearwardly and downwardly disposed guards 44 (see Fig. 8) for a purpose to be made clear, 45 are spaced apart and opposed guides secured to the forward portions of the uprights 17, 18 as at 46 and extending obliquely downwardly therefrom, and 47 are brace members secured to one of the tie rods 20 at the rearward portions of the uprights 17, 18, as at 48, and preferably extending vertically downwardly and attached to the forward portions of guides 45 of a preceding station to support said guides (see Figs. 8 and 12).

As will be more clear from Figs 13 and 14, each slide holder 49 is of peculiar construction to removably receive a lantern slide 50. That is, each slide holder consists of a plate 51 having a large opening 52 whereby the lantern slide can be visible and a margin 53 against which the margin of the lantern slide rests, and the opposite ends of the plate are upturned, one end having inwardly extending flange 54 parallel with the body of the plate and the other end having a somewhat similar flange 55 curled in toward the plate body as at 56 and adapted to hold in the pocket 57, between the plate body and flange 55 and opposite the pocket 58 between the plate body and flange 54, a leaf spring 59. The side edges 60 of each plate 51 are parallel with each other and perpendicular to the plate body, and each side edge has extensions 61 providing an ear at each corner of the slide holder. To insert a lantern slide in a slide holder, one end of the slide is pressed into the pocket 57 against the action of the spring 59 (see Fig. 14), and the opposite end is made to enter the pocket 58 (see the dotted line Fig. 14, at left), the lantern slide approximately filling the space between the side edges 60. When then the spring 59 is allowed to act, the slide is held clamped by the spring, beneath the flange 55 and in the pocket 58. The lantern slide is thus easily removable, but will not become accidentally displaced.

The slide holders are hingedly connected to each other in the manner best shown in Fig. 13, 62 denoting links between aligning ears 61 of the slide holders, desirably at the inner sides of the ears, and 63, 64 representing rivets passing through openings in the ears and links, each bushing 65 upon a rivet and between opposed links insuring the position of the links and ears.

As will be clear from Figs. 11, 12 and 13, the rivets 63 and 64 connect alternate slide holders in a continuous chain of slide holders, the rivets 64 having extended heads with enlargements 66, said heads being adapted to ride on opposed guides 45 with their enlargements beyond the guides (see Figs. 11 and 12), while the rivets 63 are adapted to pass freely between said guides 45. As will be apparent from Figs. 6 and 7, the guides 43 are spaced apart just sufficient to receive the shorter heads 67 of the rivets 63, and the enlargements 66 extend just beyond shoulders 43' of said guides 43. When then the slide holders with lantern slides are placed upon the continuous track or runway constructed as fully set forth, so that a lantern slide is upon the guides 43 and between the condenser and focusing lens, in position to be projected upon a screen, the slide holders will arrange themselves about as shown in Fig. 8, the downwardly slanting guides 45 insuring that the slide holders will move from station to station when fed along the guides 43, and the enlargements 66 of the longer rivets insuring that the holders cannot leave their guides.

The mechanism for feeding the slide holders along the guides 43 will now be described. Of this mechanism, 68 is a motor desirably fastened to the lower face of the frame plate in any suitable manner, and 69 is a worm on the motor shaft 70 mounted in bearing 71 on said frame plate, the worm 69 meshing with a worm wheel 72 mounted upon the frame plate and having a master cam 73.

Each unit or station in the machine has a rockshaft 74 mounted in the uprights 17, 18 and a bracket 75 upon the frame plate (see Fig. 5), and carrying an arm 76 adapted to be actuated by the master cam to rotate the rockshaft. Upon each rockshaft and between uprights 17, 18, spaced arms 77 are fixed (see Figs. 5 and 8), each arm 77 having an elongated opening 78 in its lower portion, said openings 78 receiving a rod 79 extending between the arms. 80 are screws secured to the rod 79 and passing through the arms 77, the screws being longitudinally adjustable in the rockshaft 74 to fix the rod 79 at desired and variable distance from said rockshaft, and 81 are links pivoted upon the rod 79 at 82 and upon levers 83 at 84 as shown at the midlengths of said levers, the upper end of each lever 83 being pivoted between uprights 17 and 18 as at 85 and the lower end of each lever pivotally carrying as at 86 an operating member 87 for feeding the slide holders. 88 are guides opposite the guides 43 and beneath which the heads of the rivets 63, 64 pass. Each guide 88 has a longitudinal slot 89 in its inner side edge in which a pin 90 securing a pawl 91 to an operating member 87 rides, each of said members 87 including a shoulder 92 adapted to limit the pivotal movement of the pawl upon its axis.

The manner in which the feeding is done will now be obvious. As the master cam is caused to rotate, each arm 76 will be successively actuated to actuate the operating members 87 at the different stations (from right to left in Fig. 8). As shown in said Fig. 8, the pawls 91 have engaged back of a slide holder between and adjacent its side bars or ears. As the operating member moves forwardly, the slide holder engaged is moved away from position between the condenser and focusing lens, and the succeeding holder is moved to focusing position. Numeral 93 represents coil springs, one for each arm 76, one end of each spring being secured to an arm 76 as at 94 and the other end being secured to the frame plate as at 95. The stroke of the operating members 87 is determined by the adjusted position of the rod 79 in the elongated opening 78 as will be evident, and as soon as the master cam releases an arm 76, the spring 94 returns this arm to its normal position, causing the operating members 87 to move back to their position of Fig. 8. As said operating members move backward, the pawls turn upon their pivots to be removed from the slide holder, see Fig. 9, with operating members at end of feeding stroke, and Fig. 10 with pawls releasing themselves from slide holder, about to slide backwardly over margin of slide holder or lantern slide adjacent the opening of slide holder. When the pawls reach their furthest position to the rear, they enter a space back of a slide holder, their own weight or a spring (not shown) accomplishing this, as they are shown in Fig. 8, ready to feed the next slide in the manner already stated.

Clearly, in the present machine the master cam feeds a slide at one station and then moves successively from station to station, each slide remaining in focusing position while the master cam makes almost a complete revolution. The length of time for the cam to make a revolution can, evidently, be varied at will by employing mechanism causing the cam to be rotated faster or slower.

Slide holders of the continuous chain can be removed or inserted by simply making a rivet 63 or 64 removable, and the guides 45 can contain a variable number of slide holders, the feeding of the slide holders along said guide 45 depending upon the downward slant of said guides as well as upon the operating members 87. As the slide holders pass along the guides 45, the rivets 64 ride on the guides at more or less distance apart, while the rivets 63, as well as all of the slide holders, are situated below said guides. The joints between the slide holders are sufficiently loose so that the continuous chain can nicely follow the track or runway. As disclosed more clearly in Fig. 8, three slide holders are always (when not being fed) upon the guides 43 and guards 44 of a station or unit. When the operating members 87 are actuated to feed a slide holder A away from a focusing station and the succeeding holder B to said station, a third holder C rides up onto the guides 43 and guards 44 which are between the slide holders and the casing of the lamp, while a fourth holder D moves to position adjacent guides 43 and guards 44. Numeral 96 denotes opposite, upwardly extending abutments at the forward ends of the guides 45. When the slide holders are as disclosed in Fig. 8 and the operating members 87 feed forwardly, a longer rivet F adjacent the rear end of the fifth slide holder E rides up over the abutments, while the said fifth slide holder E assumes a practically horizontal position, the abutments now lying between the longer rivet F and the next succeeding longer rivet G. Then during the next succeeding feeding movement of the operating members 87, the longer rivet G rides over the abutments 96, as shown in Fig. 12, while the slide holder E of said Fig. 12 is assuming the position of the holder C of Fig. 8. Now the shorter rivets 63 connecting slide holders directly back of slide holder E (Fig. 12) moved to C as described, assume the positions of slide holders D and E in Fig. 8. Upon further feeding the operations described are repeated. In leaving the guides 43 and passing onto the guides 45, as at H in Fig. 8, the rivets 64 ride upon the guides, while the rivets 63 fall first to the position shown at I and then to the position J, the slant of the guides 45, as well as the feeding movement of the operating members 87, feeding the slide holders along.

Numeral 97 denotes a spring, one at each focusing station, adapted to urge the slide holders at the stations upwardly in order that the action of the pawls in feeding the holders will be positive.

The arrangement as disclosed in Fig. 7 and as fully described provides for adjusting the lamp and condenser with respect to the uprights, and for adjusting the focusing lens toward and away from the condenser so that the advertisements of the different slides can be properly focused upon the mirror for projection to the screen. The screens naturally, will be located suitably to perform their service. The arrangement as fully set forth also cares for a direct line of travel of light from the lamp and reflector to the mirror without obliterating any part of an advertisement on lantern slides.

Having thus fully described the invention, what I claim as new and desire to secure by Letters Patent is:

1. In a machine of the character described, a plurality of slide holders each adapted to carry a lantern slide, a plurality of slide projecting stations at each of which all of the slides are adapted to be successively projected upon a screen, mechanism for feeding the slides to and from each station, and means whereby slides adjacent a station can be fed independently of all other slides in the machine.

2. In a machine of the character described, a plurality of slide holders each adapted to carry a lantern slide, a plurality of slide projecting stations at each of which all of the slides are adapted to be successively projected upon a screen, mechanism for feeding the slides to and from each station, and means for feeding a slide at a station while slides at other stations are at rest.

3. In a machine of the character described, a plurality of slide holders each adapted to carry a lantern slide, a plurality of slide projecting stations at each of which all of the slides are adapted to be successively projected upon a screen, mechanism for feeding the slides to and from each station, and means whereby the feeding of slides to and from a station is independent of the feeding of slides at other stations.

4. In a machine of the character described, a plurality of slide holders each with lantern slide, a plurality of stations each with slide projecting means, mechanism for successively feeding each slide holder past each station whereby an advertisement upon each lantern slide can be successively projected upon a screen adapted to be situated adjacent each station, and means whereby the feeding of slides to and from a station is independent of the feeding of slides at other stations.

5. In a machine of the character described, a plurality of slide holders each with lantern slide, a plurality of stations each with slide projecting means, mechanism for successively feeding each slide holder past each station whereby an advertisement upon each lantern slide can be successively projected upon a screen adapted to be situated adjacent each station, and means for feeding a slide at a station while slides at other stations are at rest.

6. In a machine of the character described, a plurality of slide holders each with lantern slide, a plurality of stations each with slide projecting means, mechanism for successively feeding each lantern slide to and away from focusing position at the different stations, and means whereby the feeding of slides to and away from focusing position at a station can be accomplished while slides at other stations remain in focusing position.

7. In a machine of the character described, a continuous chain of slide holders each with lantern slide, a plurality of stations each with means for focusing and projecting advertisements of the different slides of said continuous chain, mechanism for successively feeding each slide to and away from focusing and projecting position at each station, the mechanism being adapted to allow each slide to remain at focusing and projecting position at a station for a predetermined interval of time, and means whereby the feeding of slides to and from a station is independent of the feeding of slides at other stations.

8. In a machine of the character described, a continuous chain of slide holders each with lantern slide, a plurality of stations each with means for focusing and projecting advertisements of the different slides of said continuous chain, mechanism for successively feeding each slide to and away from focusing and projecting position at each station, the mechanism being adapted to allow each slide to remain at focusing and projecting position at a station for a predetermined interval of time, and means for feeding a slide at a station while slides at other stations are at rest.

9. In a machine of the character described, a continuous chain of slide holders each with lantern slide, a plurality of stations each with means for focusing and projecting advertisements of the different slides of said continuous chain, mechanism for successively feeding each slide to and away from focusing and projecting position at each station, the mechanism being adapted to allow each slide to remain at focusing and projecting position at a station for a predetermined interval of time, and means whereby slides adjacent a station can be fed independently of all other slides in the machine.

10. In a machine of the character described, a continuous chain of slide holders each with lantern slide, a plurality of stations each with means for focusing and projecting advertisements of the different slides of said continuous chain, mechanism for successively feeding each slide to and away from focusing and projecting position at each station, the mechanism being adapted to allow each slide to remain at focusing and projecting position at a station for a predetermined interval of time, means whereby the successive feeding of the chain of slides can be uninterrupted, and means for feeding a slide at a station while slides at other stations are at rest.

11. In a machine of the character described, a continuous chain of slide holders each with lantern slide, a plurality of stations each with means for focusing and projecting advertisements of the different slides of said continuous chain, mechanism for successively feeding each slide to and away from focusing and projecting position at each station, the mechanism being adapted to allow each slide to remain at focusing and projecting position at a station for a predetermined interval of time, means whereby the successive feeding of the slides past each station can be uninterrupted, and means for feeding slides adjacent a station while slides of the chain are at rest.

12. In a machine of the character described, a continuous chain of slide holders each with lantern slide, a plurality of stations each with means for focusing and projecting advertisements of the different slides of said continuous chain, mechanism for successively feeding each slide to and away from focusing and projecting position at each station, the mechanism being adapted to allow each slide to remain at focusing and projecting position at a station for a predetermined interval of time, means whereby the successive feeding of the slides from station to station can be performed uninterruptedly, and means for feeding slides at a station while slides in the chain are at rest, whereby the feeding of the slides can be independent of the number of slides at any time located between adjacent stations in the machine.

13. In a machine of the character described, a continuous chain of slide holders each with lantern slide, a continuous runway for said slide holders, a plurality of stations each with means for projecting advertisements of the different lantern slides upon a screen, means whereby the feeding of the chain of slide holders can be uninterrupted to successively carry each slide holder from station to station, mechanism whereby each lantern slide can be in operative position at a station for a predetermined interval of time, and means for feeding individual slide holders of the chain while other slide holders thereof are stationary.

14. In a machine of the character described, in combination, a continuous chain of slide holders, a plurality of advertisement projecting stations past which said holders are adapted to be fed, and a continuous runway for said chain of slide holders, the runway consisting of duplicate sections one for each station and comprising spaced guides, the guides at the stations being closer together than the guides between stations, and the slide holders being hingedly connected by means of relatively long rivets adapted to ride upon all of said guides and by shorter rivets adapted to ride only upon the guides at the stations and to pass freely between the other guides, mechanism for feeding the chain of slide holders along the continuous runway, and means whereby slide holders can be stationary in the machine while other slide holders are being fed.

15. The combination as specified in claim 14, wherein there are guides of each duplicate section leading from a station on a downward slant toward an adjacent station, whereby the relatively long rivets will freely slide down said last mentioned guides while the slide holders and all of the shorter rivets will fall beneath said guides to allow the long rivets to move relatively close together and toward said adjacent station, and wherein there are guides of each duplicate section leading to a station on an upward slant, the feeding of a slide holder at said station last mentioned causing the chain of slide holders directly following said feed slide holder to be straightened out so that all of said holder connecting rivets can ride upon the guides at said station.

16. The combination as specified in claim 14, wherein the continuous chain includes slide holders alternately connected by a pair of said relatively long rivets spaced apart, and a pair of said relatively short rivets spaced apart, and the guides between stations include protruding abutments over which said relatively long rivets are adapted to successively ride, for the purpose described.

17. In a machine of the character described, a continuous chain of slide holders, duplicate stations past which said holders are adapted to be successively fed and at which each holder is adapted to remain for a predetermined interval of time, mechanism for successively feeding a holder at each station, said mechanism including a master cam and devices for rotating said cam, and a rockshaft at each station, the rockshaft having an arm adapted to be actuated once by said cam during each of its revolutions to rotate said rockshaft, and a slide holder engaging member associated with said rockshaft to be thrown thereby, and means for returning the rockshaft and member to normal position when the cam has released the arm.

18. The combination as specified in claim 17, wherein there is an adjustment between said rockshaft and slide holder engaging member for regulating the throw of said engaging member.

19. In a machine of the character described, a slide holder feeder comprising members adapted to reciprocate, oppositely disposed pins carried by said members, guides in which said pins are adapted to ride, and pawls carried by said pins and adapted to engage a slide holder when the feeder moves in feeding direction and to slide over said holder when the feeder moves rearwardly.

Signed at Bridgeport, in the county of Fairfield, and State of Connecticut, this 27 day of June, A. D. 1924.

EMERICK W. BERGERE.